P. C. BROWN.

CAR COUPLING.

No. 11,403. Reissued Feb. 6, 1894.

Witnesses

C. Severance.

J. J. Inman.

Inventor

Philip C. Brown by

Francis M. Wright,

Attorney

THE NATIONAL LITHOGRAPHING COMPANY,
WASHINGTON, D. C.

UNITED STATES PATENT OFFICE.

PHILIP C. BROWN, OF WASHINGTON, DISTRICT OF COLUMBIA.

CAR-COUPLING.

SPECIFICATION forming part of Reissued Letters Patent No. 11,403, dated February 6, 1894.

Original No. 494,246, dated March 28, 1893. Application for reissue filed August 30, 1893. Serial No. 484,411.

*To all whom it may concern:*

Be it known that I, PHILIP C. BROWN, a citizen of the United States, residing at Washington, District of Columbia, have invented certain new and useful Improvements in Car-Couplings, of which the following is a specification.

My invention relates to certain new and useful improvements in car couplings, and has for its object to produce a simple and inexpensive coupling, each member of which has a reversible element that performs a different function in the operation of coupling when so reversed, a coupling that will automatically couple without the aid of a brakeman or attendant, and that can be coupled upon a grade or curve, and when coupled will automatically uncouple in the event of one of the cars being derailed and overturning, and to these ends my invention consists in the novel construction and arrangement of parts hereinafter fully described and afterward definitely pointed out in the claims, due reference being had to the accompanying drawings forming a part of this specification, wherein—

Figure 1:
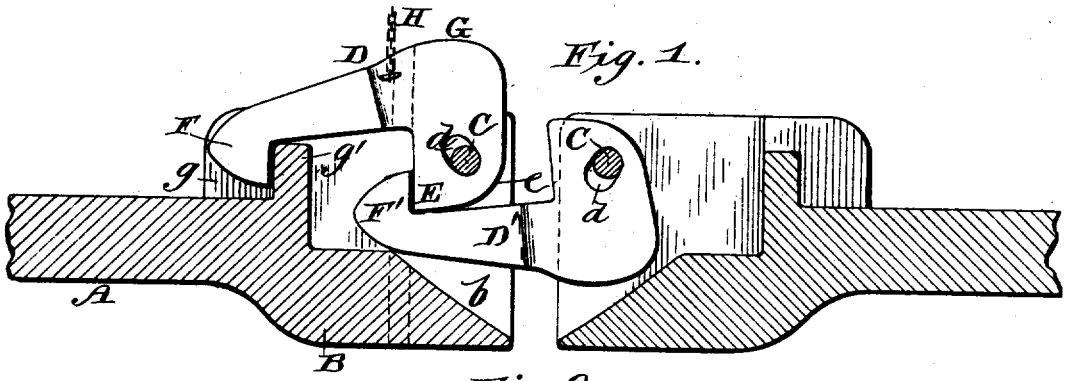
Figure 2:
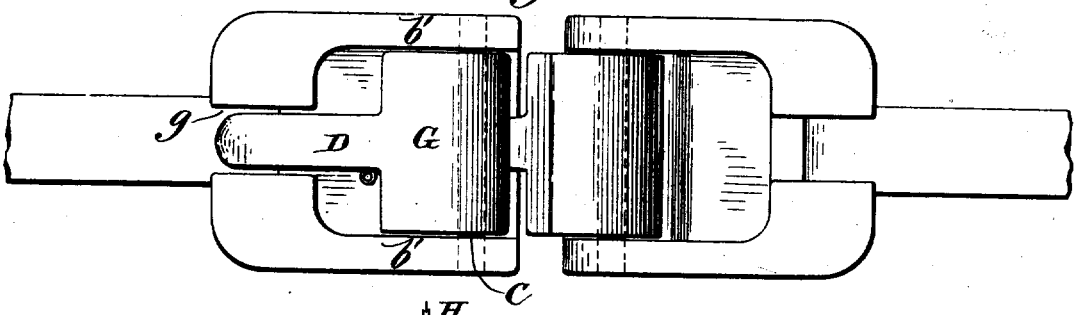
Figure 3:
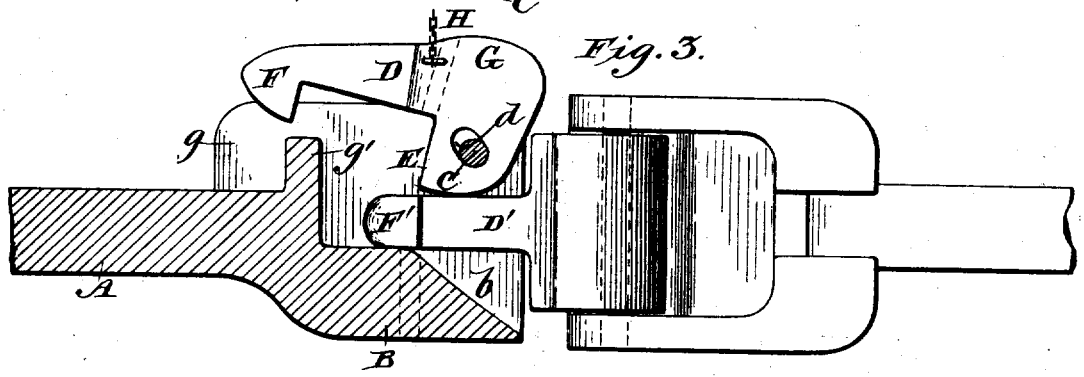
Figure 4:
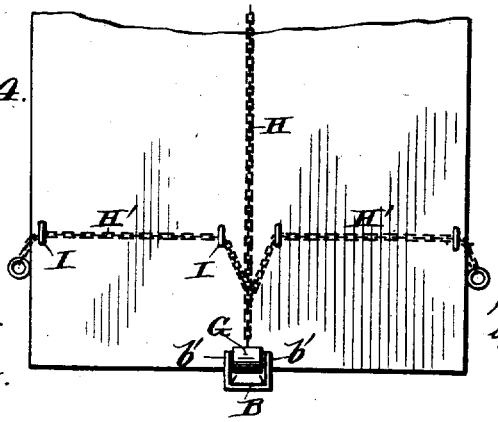

Figure 1 is a vertical, longitudinal central section of my improved coupling in a coupled position; Fig. 2 a top plan view thereof; Fig. 3 a side elevation, partly in section, showing the manner in which the cars are uncoupled when one of them is overturned; and Fig. 4, an end view of a car showing the means for operating the coupling.

In describing the construction of the coupling, one member thereof only need be described, both members being identical, and for the sake of clearness the member upon the left hand of Fig. 1 will be selected.

Referring to the drawings, the letter A indicates the draw-bar constructed and fitted to the car in the usual manner. Cast integral with the draw-bar A is the draw-head B, open upon its upper side and having its under forward portion made flaring, as at *b*.

D indicates a hooked catch pivoted between the side walls *b'*, *b'*, of the draw-head B by means of a bolt C. The forward end of the hooked catch D is provided with a downwardly projecting lip E, constituting a catch, said lip being beveled upon its forward or front end as at *e*, for the purpose hereinafter made apparent. The rear portion of the hooked catch D is reduced in width, its end terminating in a downwardly projecting hook F. The hooked catch D near its forward end is provided with an elongated aperture or slot *d* which is inclined upwardly and forwardly and through which passes the bolt C, by means of which it is pivoted between the side walls *b'*, *b'*, of the draw-head B. The rear portion of the head G of the hooked catch D is recessed, as at *g*, forming a shoulder *g'* over which the hooked end F falls and by which the said hooked catch is held.

To the rear of the head G of the hooked catch D is secured one end of a chain H, the other end of said chain extending to the top of the car, and connected with the chain H are two chains H', H', which pass over suitable guides I, I, and extend to each side of the car.

The operation of my improved coupling is as follows:—When two cars are to be coupled together, one of the hooked catches, as D, is swung by means of the chain H or H' into the position shown in Fig. 1, the other hooked catch D' being swung into position, so that the hooked end F' projects forwardly from the car, in a horizontal position, being held in such position by the head G of the hooked catch D abutting against the bottom wall of the drawhead B. As the cars are caused to approach each other, the hooked end F' of the hooked catch D' strikes against the beveled portion *e* of the lip E on the hooked catch D and causes said hooked catch to swing upon the bolt C and permit the hooked end F' to pass beneath and behind the lip E, as shown in Fig. 1. The bolt hole *e* being made elongated and inclined, as shown, the hooked catch D, in coupling, is caused to slightly rise and move forward, which does away with any lost motion, thus requiring that the hooked end need only be pushed in the drawhead sufficiently far to pass the point at which the rear of the lip E will rest when the coupling has been permitted. After the hooked end F' has passed behind the lip E, the hooked catch will drop down and back by gravity, insuring the immediate coupling of the cars. At the same time the hooked end F of the hooked catch D drops into the recess *g* and behind the shoulder *g'*. When the cars are in motion, the hooked end F fitting behind the shoulder $g'$ bears all the strain of the draft and relieves the bolt C of the same. In coupling, when the hooked end F′ passes the lip E the weight of the hooked end F will cause the hooked catch D to drop into position, but in order to insure a positive coupling under all conditions the parts are so proportioned that when the hooked end F′ has passed under and behind the lip E the forward end of the head G of the hooked catch D strikes against the lip E of the hooked catch D′, thus throwing the hooked end F backward over the shoulder $g'$ and forcing the lip E down into engagement with the hooked end F′. By recessing the rear portion $g$ of the head G, the hooked end F is prevented from being disengaged from the shoulder $g'$ when the drawbars are forced in under the cars, as for instance, when the brakes are applied or in going down a steep grade, because the said hooked end rests within the slot $g$, and is protected thereby so that it cannot come in contact with any portion of the end of the car. In the act of coupling the forward ends of the drawheads B abut against each other at the moment the coupling has been effected, and act as bumpers. It will be noticed that the hooked end F′ is of a thickness to entirely occupy the space between the bottom of the lip E, and the bottom wall of the draw-head B, which tends to prevent accidental uncoupling of the cars. Should one of the cars be derailed, and turned over, it will be automatically uncoupled, as will be readily understood upon reference to Fig. 3. In such event, the sides of the hooked end F′ being perfectly plain and smooth, said hooked end will slip from out the draw-head B, there being nothing for the lip E of the hooked catch D to engage.

By the use of my improved coupling, it is entirely unnecessary for the brakemen to go between the cars, for by means of the chains H and H′ the hooked catch can be thrown into either position to couple or uncouple from either the top or either side of the car. The cars may also be coupled upon curves or grades, and the two cars need not be of the same height.

In order to enable the ordinary link and pin to be used with one of my improved couplings, I provide the head G of the hooked catch and the bottom wall of the draw-head with pin holes for the reception of the coupling pin, the coupling being effected in the usual manner.

It will be manifest that the couplings may be turned so that they will be at right angles to the position shown in the drawings, that is to say, so that the sides of the draw-heads will then constitute the top and bottom, and will still accomplish the objects sought to be obtained.

What I claim is—

1. In a car coupling, the combination with the draw-bar and draw-head, of the pivoted hooked catch D provided at one end with a downwardly projecting lip E and at its other end with a hooked end F, and adapted to be reversed, substantially as described and for the purpose set forth.

2. In a car coupling, the combination with the draw bar and drawhead, of the hooked catch D provided at one end with the downwardly projecting lip E and at its other end with a hooked end F, said hooked catch being provided with an elongated slot inclined as shown, and a pivot bolt passing through the draw-head and said slot, substantially as described and for the purpose specified.

3. In a car coupling, the combination with the draw-bar and draw-head, of the pivoted hooked catch D provided at one end with a downwardly projecting lip E and at its other end with a hooked end F, and the shoulder $g'$ on the drawhead adapted to be engaged by the hooked end F, substantially as described and for the purpose specified.

4. In a car coupling, the combination with the drawbar and drawhead, of the pivoted hooked catch provided at one end with a downwardly projecting lip E and at its other end with a hooked end F, the drawhead being recessed as at $g$, forming a shoulder $g'$, and adapted to receive and be engaged by the hooked end F, substantially as described and for the purpose specified.

5. In a car coupling, the combination with the drawbar and draw-head, of the hooked catch provided at opposite extremities with hooked ends and near one end with an elongated slot inclined as shown, the pivot bolt passing through said slot and through the sides of the draw-head, said draw-head being provided at its rear with a shoulder $g'$, and a chain connected to said hooked catch for reversing the same, substantially as described.

6. In a car coupling, the combination, with a draw-bar and draw-head, of a catch pivoted on the draw-head and capable of reversal thereon, end for end, either end of the catch being adapted to automatically engage with the opposite end of a similar catch (reversed) on the other drawhead to couple the cars, said engagement being automatically effected by contact of the projecting end of the catch with a surface of the other drawhead, substantially as described.

7. In a car coupling, the combination, with an open-topped drawhead, of a reversible catch pivoted therein, to swing through said open top, having two hooks, both on the same side of the pivot, and both extending downwardly in one of the terminal positions of the catch, either hook engaging the other hook of a similar companion catch, reversed, on the opposite drawhead, to couple the cars, substantially as described.

8. In a car coupling, the combination, with a pair of drawheads, of similar catches similarly pivoted thereto, whereof one in its locking position passes under the other and engages it at a point below its pivotal axis, substantially as described.

9. In a car coupling, the combination, with the draw-bar and draw-head, of the reversible catch having a hooked end constructed to engage in one position the draw-head and in the other an attachment on the other draw-head, substantially as described.

10. In a car coupling, the combination, with the draw-bar and draw-head, of a reversible catch secured thereon, whereof one portion engages the drawhead to carry the strain therefrom, and another portion engages an attachment of the other draw-head, substantially as described.

11. In a car coupling, the combination, with a draw-bar and draw-head, of a catch pivoted thereto, capable of reversal on its pivot, having a forward lower portion adapted to pass under the lower portion of a similar catch, reversed, on the other draw-head to raise the same on its pivot, and a rear upper portion adapted to strike the other catch above its pivot to restore it to its locking position, substantially as described.

12. The combination, with a draw-head having a transversely extending shoulder, of a retaining block pivoted on said drawhead having two oppositely disposed lips whereof one is adapted to engage said shoulder and the other a catch on the other draw-head, substantially as described.

13. In a car coupling, a draw-head having an open top, side walls converging at the rear, and a web or shoulder between the converging walls, in combination with a catch pivoted in the front portion of the draw-head, and having a hooked portion supported by said web or shoulder between the converging walls, substantially as described.

14. In a car coupling, the combination, with a draw-head having an enlarged front portion and a small rear portion, of a catch having an enlarged portion pivotally retained in the front portion of the draw-head and a small rear portion adapted to enter the small portion of the draw-head, the enlarged portion having a lip adapted when depending from said pivot to engage a catch from the opposite draw-head, substantially as described.

In witness whereof I have hereunto subscribed my name, at the city of Washington, District of Columbia, in the presence of two witnesses.

PHILIP C. BROWN.

Witnesses:
FRANCIS M. WRIGHT,
F. V. SUMAN.